United States Patent [19]

Weber et al.

[11] 4,347,276
[45] Aug. 31, 1982

[54] DASHBOARD FOR MOTOR VEHICLES

[75] Inventors: Kurt Weber, Rimbach; Peter Rutsch, Abtsteinach; Lothar Hirschinger, Mannheim, all of Fed. Rep. of Germany

[73] Assignee: Firma Carl Freudenberg, Weinheim an der Bergstrasse, Fed. Rep. of Germany

[21] Appl. No.: 251,769

[22] Filed: Apr. 7, 1981

[30] Foreign Application Priority Data

Apr. 26, 1980 [DE] Fed. Rep. of Germany ....... 3016199

[51] Int. Cl.³ .................. B32B 3/24; B32B 3/26; B32B 5/00; B32B 5/20
[52] U.S. Cl. .................................. 428/160; 180/90; 280/752; 428/172; 428/285; 428/286; 428/304.4; 428/309.9; 428/319.3
[58] Field of Search ............. 180/90; 280/752; 296/70; 428/310, 313, 315, 71, 159, 160, 172, 285, 286, 304.4, 309.9, 319.3, 319.7, 319.9, 319.1

[56] References Cited

U.S. PATENT DOCUMENTS

| 3,088,539 | 5/1963 | Mathues et al. | 428/319.1 |
| 3,960,999 | 6/1976 | Massie | 428/319.1 |
| 4,268,557 | 5/1981 | Bracesco | 428/315.5 |

Primary Examiner—William J. Van Balen
Attorney, Agent, or Firm—Kenyon & Kenyon

[57] ABSTRACT

A dashboard is constructed of a formed plastic sheet and polyurethane foam laminate having a reinforcement fixture and mat embedded in the foam.

9 Claims, 1 Drawing Figure

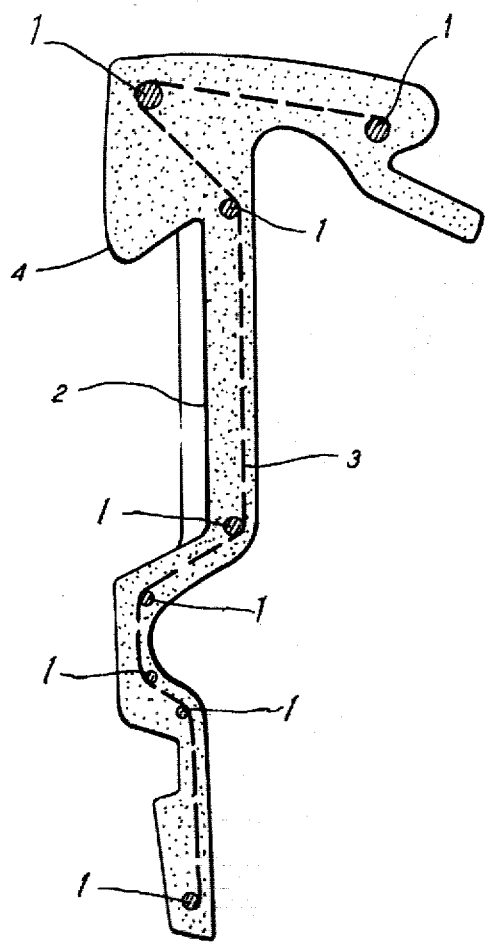

DASHBOARD FOR MOTOR VEHICLES

BACKGROUND OF THE INVENTION

The invention relates to a dashboard for motor vehicles. More particularly, it relates to a dashboard prepared from a plastic sheet which is deep-drawn to the dashboard shape and is supported with polyurethane foam reinforcement underneath.

Plastic molded dashboards are presently used in passenger cars of the mid-range size. They consist of a sheet, about 1 mm thick of ABS plastic, which is supported underneath with polyurethane foam stiffened by deep-drawn sheet steel. This construction, however, causes the disadvantage that noise and vibrations from the car body are radiated by the surface of the ABS sheet with undiminished intensity into the interior of the passenger car. In addition, such dashboards are heavy, and the fabrication of the deep-drawn sheet steel support is cumbersome and expensive.

It is an object of the invention to develop a dashboard which, with good cushioning of the surface and comparable mechanical strength, has less weight, better attenuates mechanical vibrations and can be inexpensively produced.

SUMMARY OF THE INVENTION

According to the invention, there is provided a deep-drawn plastic sheet having a dashboard shape which is laminated or joined underneath to polyurethane foam.

A mat of mineral fibers and a fixture of reinforcement members arranged in truss fashion are embedded in the foam to provide support.

BRIEF DESCRIPTION OF THE DRAWING

In the drawing an embodiment of a dashboard, FIG. 1, according to the present invention, is shown in a cross-sectional view.

The dashboard is made from a deep-drawn plastic sheet (4), about 1 mm thick, provided with a surface grain pattern. On the back side, the sheet is laminated to semi-hard polyurethane foam (2) with a specific gravity of 250 kg/m$^3$. The polyurethane body (2) is reinforced by a fixture of metal rods (1) which are welded together in truss-fashion, and by a glass fiber mat (3) which completely covers the rods (1) and the spaces between them. The glass fiber mat (3) has an area weight of 600 g/cm$^2$, and the rods (1) have a circular cross section with a diameter of 4 mm.

DETAILED DESCRIPTION OF THE INVENTION

The dashboard according to the present invention can in general be produced by state of the art methods. After deepdrawing the plastic sheet to the form of a dashboard, a fixture of reinforcement members joined together in truss-fashion and a mat of mineral fibers are inserted and a polyurethane reaction mixture is then foamed into the mold to make the dashboard. The fixture and mat on the back side of the dashboard and the semihard polyurethane foam, which typically has a specific gravity of 150 to 350 kg/m$^3$, provide a good cushioning effect. The fixture members which are joined together in truss-fashion and the mineral fiber mat are completely embedded in the polyurethane foam. All cavities of the mat and fixture are completely penetrated by the polyurethane foam. A weight savings of about 30% is realized by the elimination of a deep-drawn sheet steel support but the dashboard of the invention nevertheless exhibits excellent overall strength. This high overall strength is of considerable advantage in as much as mechanical vibrations are only transmitted to a very limited degree into the interior of the polyurethane foam and thereby to the plastic sheet, so that radiation of vibrations into the interior of the motor vehicle is substantially prevented.

A further improvement of the sound-deadening properties of the proposed dashboard can be obtained by significantly varying the wall thicknesses in different regions. The individual regions are thereby given different resonance frequencies which will cause additional mutual damping of the vibrations. Comparable variations in thickness cannot be obtained by state of the art methods because the flow properties of the polyurethane reaction mixture producing the foam are inhibited by the deep-drawn sheet steel support.

The members which compose the fixture can be welded or riveted together. Welding is preferred for production reasons when the adjoining members are of the same material or are of similar, weldable materials. Riveting is used when the members are of different unweldable materials. It is also possible to cement the members together but this process will be more time-consuming.

The members may be composed of plastic or metal. For safety reasons it is advantageous if at least the members which have an arrangement transverse to the direction of travel are made of metal. The mutual spacing can be relatively large, 10 cm or more. If metal members are used, wires or sheet metal strips are preferred and the latter may have a multi-angled profile. It has been found that preferred cross section range is 8 to 20 mm$^2$. If the cross section is smaller, the members may cut into the polyurethane foam in the event of stress overload such as an accident. If the cross section is larger, unnecessary weight concentration results which cannot be transmitted to the polyurethane foam.

The mat and the members of the fixture are preferably sewn or cemented together. This ensures that the preferred mutual relations are not changed during the foaming process. If cementing is used, the adhesive should be one which also provides a good bond to the polyurethane foam. The process of cementing can be realized by immersing the prepared reinforcement fixture in the adhesive solution and subsequently covering it with the mineral fiber mat.

Depending on the application, the mineral fiber mat may have various area weights, such as a range from 200 to 800 g/m$^2$. The mat is preferably made of glass fibers with an average diameter of 20 $\mu$m. A typical mat will have an area weight of 600 g/m$^2$.

The fibers of the mat need not be agglomerated in a perfectly uniform distribution. It has been found to be advantageous in most cases if 10 to 30 glass fibers are combined to form a glass fiber strand and the individual glass fiber strands are joined together in the manner of a bonded fabric without any preferred orientation. It is believed that the better strength properties resulting from the use of such a glass fiber mat are the consequence of the relatively large spacings between the individual glass fiber strands and the texturing of the threads within the glass fiber strand. Each individual strand is embedded in such a short time by the reaction mixture of polyurethane that the latter does not penetrate into the spaces between the individual threads of an individual glass strand. The good acoustical properties may also be due to this phenomenon.

We claim:

1. A dashboard for a motor vehicle which comprises a deep-drawn plastic sheet having a dashboard shape laminated underneath to polyurethane foam in which is embedded a fixture of reinforcement members arranged in truss fashion and a mat of mineral fibers, said mat completely covering all members and spaces of said fixture.

2. A dashboard according to claim 1 which further comprises a plastic sheet having a surface grain pattern.

3. A dashboard according to claim 1 wherein the members are rods which are welded or riveted together.

4. A dashboard according to claim 1 wherein at least the rods arranged transversely to the direction of travel are metal rods.

5. A dashboard according to claim 4 wherein the metal rods are wires or sheet metal strips having an angled profile.

6. A dashboard according to claim 4 wherein the cross section of the metal rods has an area of from about 8 to about 20 mm$^2$.

7. A dashboard according to claim 1, 2, 3, 4, 5 or 6 wherein the mat and the fixture are bound together.

8. A dashboard according to claim 1, 2, 3, 4, 5 or 6 wherein the mat has an area weight range of from about 200 to about 800 g/mm$^2$ and is made of glass fibers having an average diameter of about 20 μm.

9. A dashboard according to claim 6 wherein from 10 to 30 glass fibers are combined to form a glass strand and the glass strands are combined to form the mat in the manner of a bonded fabric without a preferred orientation.

* * * * *